Sept. 20, 1966  A. D. DE WEES  3,273,751
PALLET DISPENSER
Filed Aug. 26, 1964  2 Sheets-Sheet 1
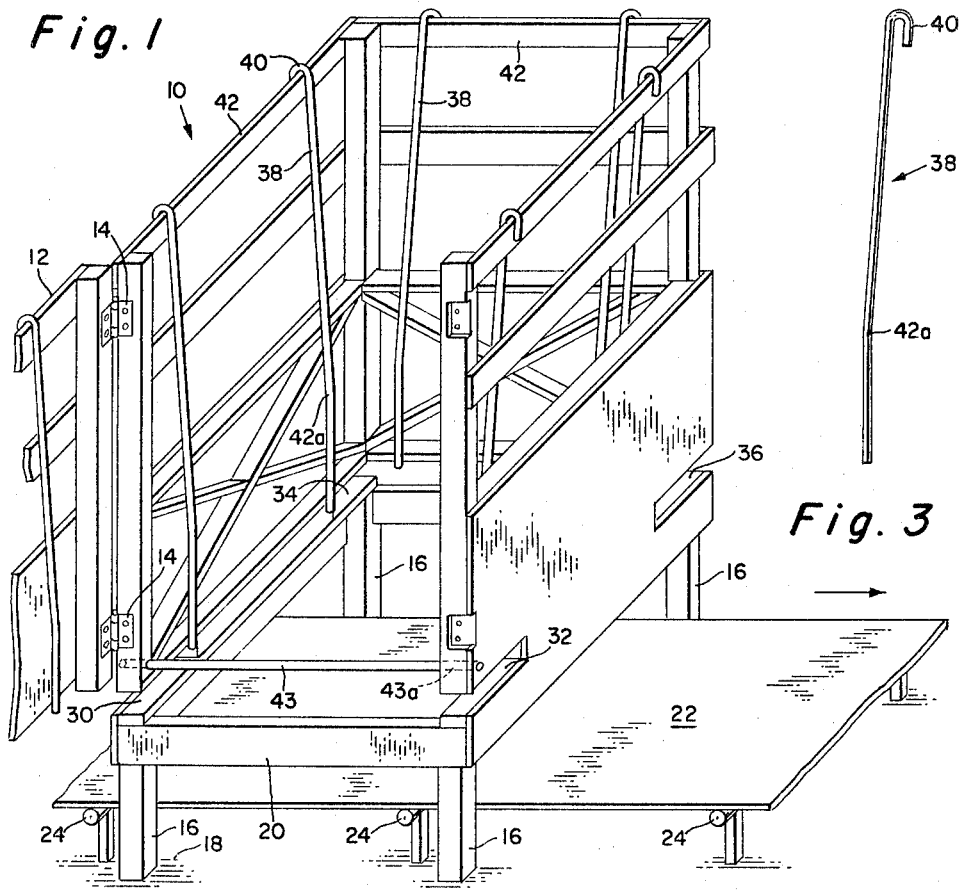
Fig. 1
Fig. 3
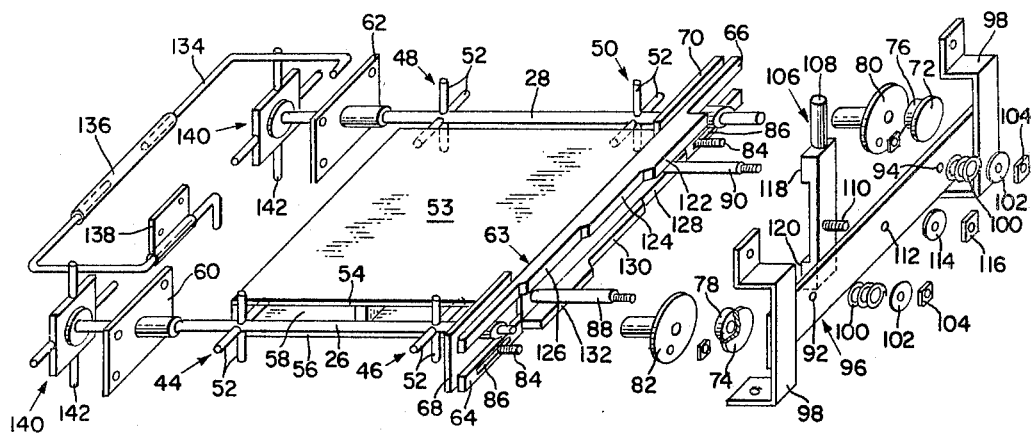
Fig. 2
INVENTOR.
ARNOLD D. DEWEES Sept. 20, 1966  A. D. DE WEES  3,273,751
PALLET DISPENSER Filed Aug. 26, 1964  2 Sheets-Sheet 2

INVENTOR.
ARNOLD D. DEWEES

3,273,751
PALLET DISPENSER
Arnold D. De Wees, 1730 Ebers St., San Diego, Calif.
Filed Aug. 26, 1964, Ser. No. 392,359
4 Claims. (Cl. 221—281)

The invention described herein may be manufactured ad used by or for the Government of the United States of America for governmental purposes without the payment of any royalties thereon or therefor.

The present invention relates in general to a device for dispensing articles of relatively flat configuration, and, more particularly, to an arrangement for sequentially depositing pallets from a stack onto a moving conveyor belt or platform.

Pallets are extensively used in industrial establishments for moving in a single operation a number of objects from one location to another. This is usually accomplished by having a fork-lift truck engage the undersurface of a pallet on which one or more objects have been placed, raise the pallet from the area on which it was resting, move it to a new location, and then deposit the pallet without in any way coming into contact with the article or articles carried thereon. Other uses are in separating a number of dissimilar elements into groups so that all of the elements on any one pallet have like characteristics. In such cases, it is obviously necessary that more than one pallet be available onto which the different groups of elements can be placed.

For the above reasons, many industrial organizations provide a stack of pallets in each area where separating or transporting operations are to be carried out. Formerly, it was customary for the individual in charge of these operations to remove a pallet from the top of a stack and then place it by hand in position to be loaded. Such stacks often reached a height of 10 to 15 feet, and it was not only inconvenient but also somewhat hazardous for the operator to handle the pallets in this manner since each pallet can weight as much as 90 lbs. Furthermore, since the pallets are usually constructed of wood, the operator was likely to be injured by splinters or to come into contact with the projecting points of nails by means of which the various portions of the pallet are held together.

It has therefore been proposed to overcome some of these disadvantages by providing a device by means of which individual pallets can be dispensed automatically from a stack, with this dispensing action being such that the lowermost one of the pallets is made available, rather than utilizing that particular pallet which is on top of the stack. For example, one arrangement now known in the art comprises a housing for a stack of pallets, the lowermost part of this housing containing a pair of sprocket wheels the fingers of which project into the space between the platform of the pallet and the underside bracing member attached thereto. These sprocket wheels are mounted on a pair of spaced-apart parallel shafts pivotally carried by two opposite walls of the dispensing device, such that synchronous rotation of the shafts in opposite directions results in the sequential release of pallets from a stack which is positioned above the sprocket wheels and rests thereupon. While such an arrangement has certain desirable features, nevertheless it also possesses a number of limitations, one of which is that it will accept pallets for dispensnig only when such pallets are all of the same size and are dimensioned so as to fit precisely the opening in the dispenser through which they must pass. In addition, the power for rotating the shafts upon which the sprocket wheels are mounted is conventionally provided by electric motors or hydraulic valves, and consequently is both costly and subject to electrical and/or mechanical breakdown. Still further, the size and weight of a complete dispenser as now known is such that it is difficult to move from one location to another, and this lack of portability limits its usefulness.

In accordance with a feature of the present invention, a dispenser of the general nature discussed above is provided from which a number of pallets may be sequentially deposited on a moving conveyor belt or platform at times precisely selected by the individual controlling the dispensing operation. To accomplish this objective, the dispensing structure is located directly above such conveyor belt or platform, and is provided with an opening through which a stack of pallets may be inserted from one side of the conveyor belt by a means of a fork-lift truck, or, alternatively, by hand.

An outstanding characteristic of the present concept, in one embodiment, is that no external power is required in order to operate the pallet-releasing mechanism. Instead advantage is taken of the weight possessed by a stack of pallets, such force being utilized to perform the dispensing action by loading the respective sprocket wheels upon which the lowermost pallet of the stack is resting. To control the particular times at which a pallet is released from the stack, a braking mechanism is provided which is associated with the shafts upon which the sprocket wheels are carried. This braking mechanism is under the control of the operator, and is released at those time instants when the dispensing of a pallet is desired. The weight of the pallets in the stack act to turn the sprocket wheel shaft, which limited wheel rotation (while the brake mechanism is released) permits the lowermost pallet to drop from the stack onto a conveyor belt. Following such action, if the operator does not wish another pallet to be so dispensed, he sets the brake to prevent further rotation of the sprocket wheel shafts, and this maintains the stacked condition of the remainder of the pallets.

Because no power other than the force of gravity is needed to operate the dispensing mechanism, it is possible to materially reduce the weight of the dispenser and thus make it much more readily portable from one location to another. This is of considerable benefit in many situations where a fixed dispenser would have limited utility. An additional feature of the present concept is that the invention device can be made to accept pallets of different sizes by utilizing guide rods which are placed within the dispenser and so located as to channel the individual pallets which make up the stack toward the center of the inner dispensing area such that, when they arrive in the vicinity of the sprocket wheels, they are spaced equidistantly form the sides of the framework and hence will rest centrally upon the sprocket wheel projections. It has been found in practice that an off-centering of a pallet at this point will cause one side of the pallet to drop onto the conveyor belt before the remaining side drops, and this can bring about an irregularity in the alignment of the pallet after it has reached the conveyor belt. Then, too, because of the manner in which the pallets are loaded into the dispenser, the operator is relieved of the necessity of handling the pallets, and hence there is no likelihood of his being injured by an direct contact therewith.

One object of the present invention, therefore, is to provide a device for dispensing pallets or similar articles onto a moving conveyor belt or platform.

Another object of the invention is to provide a dispensing device for sequentially dispensing groups of articles in cases where the individual members of each group may be of different overall dimensions from the members of the other groups.

An additional object of the invention is to provide a pallet dispenser of the type described wherein sequential dispensing of the pallets is brought about by a gravity feed, the time instants at which successive pallets are dispensed being controlled by a manually-actuatable braking mechanism.

A still further object of the invention is to provide a pallet dispenser of the type described in which a stack of pallets is arranged to rest upon a pair of sprocket wheels, such wheels being synchronously rotated by a driving mechanism the operation of which is manually controllable.

Other objects, advantages, and novel features of the invention will become apparent from the following detailed description of the invention when considered in conjunction with the accompanying drawings, wherein:

FIG. 1 is an isometric view of a portion of a pallet dispenser designed in accordance with a preferred embodiment of the present invention;

FIG. 2 is an isometric exploded view of a further portion of a pallet dispenser designed to be incorporated into the structure of FIG. 1;

FIG. 3 is a plan view of one of the elements shown in FIG. 1, bringing out more clearly the configuration thereof;

Figure 4:
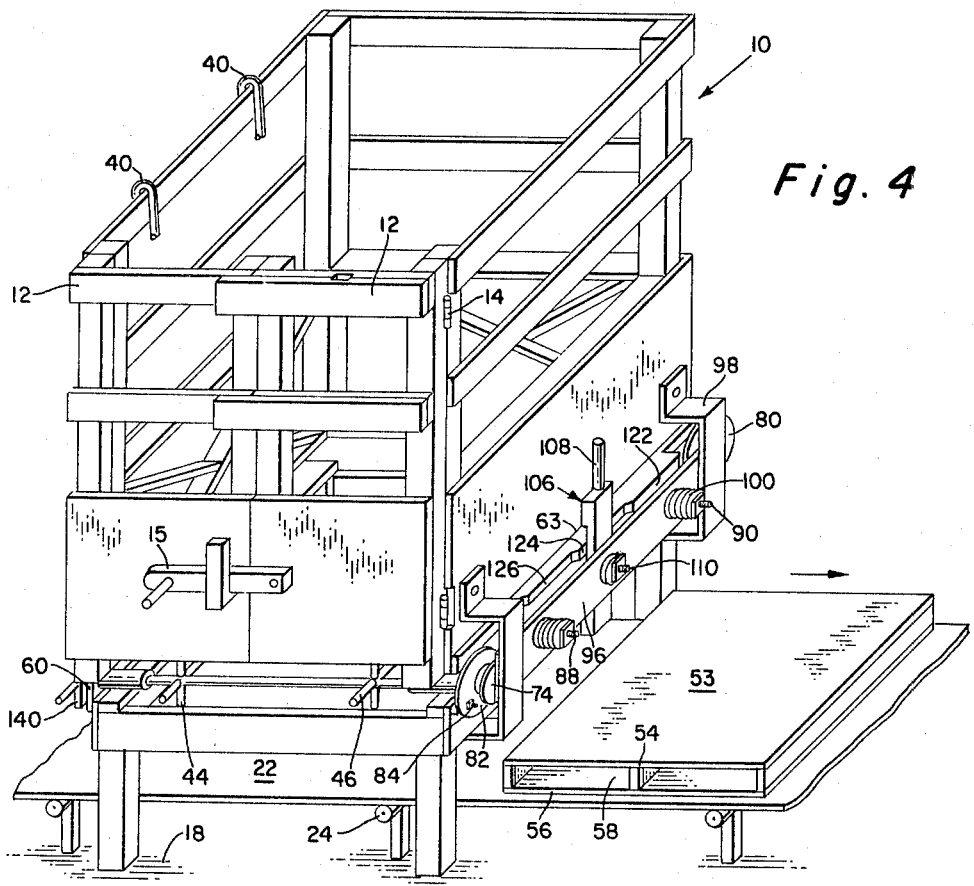
FIG. 4 is an assembled view of the pallet dispenser of FIGS. 1 and 2, illustrating the braking mechanism by which dispensing of the individual pallets is controlled by an operator.

Referring now to the drawings, and more particularly to FIGS. 1 through 4 thereof, there is shown a preferred form of dispenser for pallets or other like articles, this dispenser including a box-like housing or enclosure, generally identified by the reference numeral 10, having one open side through which a stack of pallets may be loaded into the dispenser. After loading, the housing may be closed by a pair of gates 12, one of which is shown in FIG. 1. These gates are attached to the housing 10 by hinges 14, and can be secured in closed position by means of a catch 15 which will be further referred to in connection with a description of FIG. 4.

The dispenser of FIG. 1 and 4 is mounted on four legs 16 intended to rest upon a supporting surface 18. Between this supporting surface and the lowermost horizontal structural element 20 of the housing 10 passes a continuous conveyor belt 22 supported upon a plurality of rollers 24, this belt 22 being adapted to receive pallets dispensed from housing 10, in a manner subsequently to be described, and to convey these pallets to a point remote from the dispenser.

The present concept provides means whereby individual pallets from a stack of such articles which, having been loaded into the housing 10 by some means such as a fork-lift truck, may be sequentially released from the enclosure onto the moving conveyor belt 22 at particular time instants which are decided upon by an operator stationed in the vicinity of the dispensing apparatus. This releasing mechanism is shown in FIG. 2 separately from the housing of FIG. 1 in order to bring out the operating characteristics thereof. It includes a pair of rotatable shafts 26 and 28 which are horizontally mounted in spaced-apart parallel relation and with their axes aligned with the direction of movement of the conveyor belt 22. The respective ends of the shaft 26 are receivable in a pair of slots 30 and 32 formed in opposite sides of the enclosure 10, these slots extending for a sufficient distance inwardly to allow for a lateral adjustment of the shaft 26, which, as will subsequently be brought out, is desirable to permit pallets of different outer dimensions to be dispensed from the invention device. In similar fashion, a further pair of slots 34 and 36 are provided on the opposite side of the dispenser to receive the shaft 28 and likewise permit a lateral adjustment thereof. It might be mentioned at this point that pallets of the type intended to be dispensed by the invention apparatus commonly possess a minimum size of 40 inches by 48 inches and a maximum size of 48 inches by 48 inches. Thus only a lateral adjustment of the shafts 26 and 28 is necessary to adapt the dispenser to any size pallet between these limits. Means are also provided for centering the stacked pallets within the enclosure 10 so that they can be readily dispensed by the apparatus of FIG. 3. Such means include a plurality of guide rods 38 (commonly eight such rods are employed, two on each side of the enclosure 10 and one on each of the gates 12) these guide rods 38 preferably being made of some rigid material such as iron tubing and respectively hung by their hooked upper ends 40 (FIG. 3) onto the uppermost transverse cross-number 42 of the enclosure 10 as well as upon the upper cross-member of each gate 12. As best shown in FIG. 3, each guide rod 38 is bent at an intermediate point 42, so that the interior dimensions of the enclosure 10 are greater at the top than they are below this bend 42 in each guide rod. As a result, a stack of pallets loaded from a fork-lift truck (for example) into the upper part of the dispenser will be automatically aligned in a vertical sense as the lift truck lowers the stack into the dispenser. As will be later apparent, such vertical alignment of the pallets precludes any possibility that they will jam the dispensing mechanism of FIG. 2 and interfere with the proper releasing action. The size of each of the guide rods 38 is chosen in accordance with the width of the pallets to be dispensed, so that, regardless of the dimensions of these articles, they will still be centered within the enclosure 10 and in position to be engaged by the releasing apparatus of FIG. 2, which will now be described in detail. Before doing so, however, it should be noted that after a stack of pallets has been lowered into the dispenser from a fork-lift truck, a drag bar 43 is inserted into the pair of openings 43a in the framework of the enclosure to permit the forks of the truck to be withdrawn without moving the stacked pallets.

As shown in FIGURE 2, each of the shafts 26 and 28 carries thereon a pair of sprocket wheels 44, 46 and 48, 50, respectively. These sprocket wheels are arranged as shown in opposed pairs, and each has a plurality of equally-spaced radially-projecting fingers 52 thereon. In FIG. 2, each of the sprocket wheels is illustrated as having four fingers, the corresponding fingers of opposed sets, when facing inwardly, serving to engage the underside of the platform of the lowermost one of the stack of pallets within the enclosure 10 and to support such stack therebetween. As shown in the drawing, the fingers 52 of each of the sprocket wheels are circumferentially spaced about their respective hubs, or points of attachment, so that, upon rotation of the shafts 26 and 28, and prior to releasing of the lowermost pallet by one set of fingers, the next set of fingers engages the under side of the platform of the next successive pallet in the stack. The radial length of each of the fingers 52 is consequently chosen so that this action can be carried out without any jamming of the dispensing mechanism and without any possibility that more than one pallet will be dispensed by the releasing mechanism of FIG. 2 at any one time.

In initially setting up the dispenser of FIGS. 1 through 4 to receive a load of pallets, the shafts 26 and 28 are angularly oriented so that, when the lowermost pallet of the stack reaches the bottom part of the dispenser, one of the projecting fingers 52 of each of the sprocket wheels 44, 46, 48 and 50 enters the space between the platform of the pallet and the lower horizontal stringer thereof. A representative pallet 53 of the type adapted to be dispensed by the invention apparatus is shown in FIG. 4 after having been released onto the conveyor belt 22. In this figure, the platform is designated by the reference numeral 54 and the lowermost horizontal stringer by the reference numeral 56, such that a finger 52 of each sprocket wheel can enter the opening 58 between these members, the platform 56 consequently resting upon the outer extremity of each finger. It is important that the edges of the pallet which is being supported by the sprocket wheels not be too close to the shafts 26 and 28, since if the pallets are not sufficiently spaced from these shafts then it has been found in practice that insufficient leverage is produced to rotate the shafts and hence bring about the gravity feed which is an important part of applicant's concept. On the other hand, if the edges of the pallets are too far away from the shafts or axles 26 and 28, then, upon rotation of the shafts, the extremities of the fingers 52 will lock into the pallets and jam the load.

It has been stated that the distance between the shafts 26 and 28 can be varied to accommodate pallets of different widths. In order to make such an adjustment without dissembling the dispenser, the shafts 26 and 28 are free to move laterally within the slots 30, 32, 34 and 36. When a desired lateral position of the shafts has been selected, a flanged bearing 60 (FIG. 2) is secured by some suitable means such as a plurality of screws (not shown) to that wall portion of the housing 10 in which is formed the slot 30. In similar fashion, a further flanged bearing 62 through which passes the shaft 28 is attached to the same wall but in the vicinity of the slot 34. When the flanges 60 and 62 have thus been secured in place, the shafts 26 and 28 are maintained in horizontal alignment with respect to one another and with a given lateral displacement therebetween.

At the other end of each of the shafts 26 and 28 is located a bar 63 which forms part of a braking mechanism and is designed with a pair of bifurcated extremities through which the ends of the two shafts respectively pass. These bifurcated bar portions are respectively designated in the drawing by the reference numerals 64 and 66.

A pair of flanged bearings similar to those designated by the reference numerals 60 and 62 are employed to maintain the shafts 26 and 28 in position in the region where they pass through the slots 32 and 36 formed in the housing 10 and also through the slots in the bifurcated end portions 64 and 66 of the bar 63. These flanged bearings, illustrated in the drawings by the reference numerals 68 and 70, have their axial portions receivable in the slots 32 and 36, with the shaft 28 extending through the wall of the enclosure 10 and terminating at a point where a disc 72 is securely attached thereto. In like manner, the shaft 26 extends through the bifurcated bar portion 64 to a point where a disc 74 is carried. Each of the discs 72 and 74 has affixed to the inner surface thereof a further disc or annular ring, 76 and 78 respectively, of some material which possesses a high coefficient of friction, such, for example, as asbestos or brake lining. The members 72 and 76 are securely bonded together, both with respect to one another and to the shaft 28 upon which they are carried, and the members 74 and 78 are likewise bonded to each other and to the shaft 26, so that rotation of either shaft correspondingly rotates all of the elements carried thereon in unitary fashion. The friction discs 76 and 78 are designed to selectively engage the surfaces of further discs 80 and 82 which are carried upon the shafts 28 and 26, respectively, but these further discs are so mounted as to remain stationary while the respective shafts which pass therethrough rotate. To preclude rotation of each of the discs 80 and 82 when the respective shafts upon which they are mounted undergo rotation, each disc is provided with an opening through which passes a bolt 84, these bolts 84 being receivable in aligned openings 86 formed in the lower bifurcated extremities 64 and 66 of the bar 63. It will now be appreciated that each of the shafts 26 and 28 is free to rotate when the friction disc carried thereby (such, for example, as that identified by the reference numeral 78) is out of engagement with its associated disc (such as 82). However, a relative longitudinal movement between the elements 78 and 82 to produce a pressure of one against the other will create a frictional engagement which tends to hinder free rotation of the shaft 26 and hence maintain the fingers 52 of the sprocket wheels 44 and 56 in a given position. This will hold whatever pallet is resting upon the fingers 52 in place and hence prevent it from lowering to a point where it can disengage itself from the sprocket wheels and fall onto the conveyor belt 22. The particular means for bringing about a relative axial displacement of the brake members 76 and 78 with respect to their associated brake discs 80 and 82 is illustrated in FIG. 2 and will now be described in detail.

As best shown in FIG. 2 of the drawings, the bar 63 has mounted thereon a pair of axial projections 88 and 90 which extend outwardly therefrom and parallel to each of the shafts 26 and 28. These two axial projections have threaded extremities which respectively pass through openings 92 and 94 formed in a metal strip 96, the latter being disposed to lie generally parallel to the bar 63 and in spaced-apart relation thereto. This strip 96 is welded on each of its ends to brackets 98, the latter being securely attached by some means (such as a plurality of screws) to the outer surface of the enclosure 10. As best shown in the assembled view of FIGURE 4, the friction discs 76 and 78, as well as their associated members 80 and 82, lie between these brackets 98 and the bifurcated bar 63, through the bifurcations of which the shafts 26 and 28 extend.

In accordance with a feature of the present invention, the pallets which are stacked within the enclosure 10 are sequentially released onto the conveyor belt 22, and this action takes place in a controllable fashion by selecting those time periods when the shafts 26 and 28 are permitted to rotate, thereby periodically producing engagement and subsequent disengagement between the projecting fingers 52 and the lower surface of each pallet platform 54. In order to thus control the shafts 26 and 28, the friction material of which the discs 76 and 78 are composed is selectively brought into compressional engagement with the surface of the respective disc 80 or 82 which is associated therewith. The manner in which this action takes place is through a movement of the bifurcated bar 63 (together with the discs 80 and 82 which are attached thereto by the bolts 84) toward or away from the friction discs 76 and 78.

The bar is supported by the metal strip 96. As shown in FIGS. 2 and 4, the axial projections 88 and 90 which are welded or otherwise secured to bar 63 extend through the openings 92 and 94 of the metal strip, and are each spring-loaded so that the bar 63 is urged toward the metal strip 96. This is brought about by employing a pair of helical springs 100, which respectively surround the outer extremities of the axial projections 88 and 90, and are held in position against the outer surface of the metal strip 96 by a pair of washers 102 and a pair of nuts 104. The action of the spring elements 100 is such as to bias the bifurcated bar outwardly toward the metal strip 96.

To control the amount of displacement between the bar 63 and the metal strip 96, and consequently the compressional force developed between the friction material of the discs 76 and 78 and their respective stationary elements 80 and 82, the bar 63 has formed on its outer surface a plurality of cammed portions arranged to be selective contacted by a manually-actuatable lever 106, the latter having a handle 108 by means of which an operator may actuate the lever 106 about an axis represented by a threaded pin 110 which lies parallel both to the shafts 26 and 28 and to the projections 88 and 90. This threaded pin 110 is securely attached to the outer surface of the lever 106 and extends through an opening 112 formed in the metal strip 96, where it is held in position for limited rotation by means of a washer 114 and a nut 116.

As perhaps best shown in FIG. 2, the outer surface of the bar 63 is cut back in "step" fashion so as to create a plurality of cam surfaces. These surfaces are intended to be selectively engaged by the inner surface portion of the lever 106 when the handle 108 is actuated. This lever 106 is accordingly formed with two contacting surface portions 118 and 120 respectively lying on opposite sides of the threaded pin 110 about which the lever 106 is rotatable. The upper surface portion 118 of the lever 106 is designed to selectively engage one of the three upper cammed surface portions 122, 124 and 126 of the bifurcated bar 63, while the lower surface portion 120 of the lever 106 is designed to selectively engage one of the three lower cammed surface portions 128, 130 and 132 of the bar. Inasmuch as rotation of the lever 106 causes the surface portions 118 and 120 thereof to move in opposite lateral directions, the upper cammed surface portion 126 of the bar 63 corresponds in thickness (of the bar) to the lower cammed surface portion 128, so that when the handle 108 is manually actuated, the surface portion 118 of the lever 106 may engage (for example) the thickest cammed surface 122 of the bar 63, while at the same time the lower surface portion 120 of the lever 106 engages the thickest lower cammed surface portion 132 of the bar. In this position, both ends of the bar 63 are forced away from the metal strip 96 and there is little, if any, frictional engagement between the discs 76 and 80 as well as between the discs 78 and 82. The shafts 26 and 28 are consequently free to rotate, and will do so due to the weight of the stack of pallets contained within the enclosure 10, the bottommost pallet resting, as above stated, upon the fingers 52 of the respective sprocket wheels 44, 46, 48 and 50. In this position of the handle 108, the pallets are sequentially dispensed one after the other onto the conveyor belt 22.

If the operator now desires to terminate the dispensing action, he will actuate the handle 108 to one of its other positions, depending upon the number of pallets remaining in the enclosure 10 and upon the weight thereof. If an average number of pallets remain, the handle 108 is set in its mid position, where it is essentially vertical as shown in FIGS. 2 and 4. In this position, the respective surface portions 118 and 120 of the lever 106 engage the upper cammed surface 124 of bar 63 and the lower cammed surface 130, and, since the thickness of these cammed surfaces 124 and 130 is less than that of the cammed surfaces 122 and 132, the bar 63 is separated from the metal strip 96 by a lesser distance than was the case in the handle position above described. This brings the friction disc 78 into a higher degree of compressional engagement with the disc 82. The same effect occurs with respect to the elements 76 and 80. As a consequence, the shafts 26 and 28 will be restrained from rotating, and, with a proper choice of dimensions and depending upon the nature of the material of which the friction discs 76 and 78 are composed, this restraint can be closely predetermined. With an average number of pallets in enclosure 10, therefore, a setting of the handle 108 in the illustrated position will terminate or preclude any release of those pallets contained within the device.

If the enclosure 10 contains a large number of pallets, a higher degree of braking action may be required. This is attained by placing handle 108 in its third position, in which the upper surface portion 118 of the lever 106 engages the upper cammed surface portion 126 of the bar 63. At the same time, the lower surface portion 120 of the lever 126 correspondingly engages the lower cammed surface portion 128 of the bar. Both of these surface portions 126 and 128 are of minimum thickness, so that the bar 63 now approaches more closely the metal strip 96. This results in even more frictional engagement between the discs 78 and 82, as well as between the discs 76 and 80. The shafts 26 and 28 are now placed under increased restraint, and will not rotate even in the face of a considerable weight of pallets resting upon the fingers 52. The operator thus is provided with a selectable amount of control over the dispensing action, and can choose the particular dispensing position of the handle 108 which is of maximum effectiveness in view of the number of pallets remaining within the enclosure 10. It is necessary that the braking mechanism be controllable, since each time a pallet is dispensed from the bottom of the stack, the combined weight of the remaining pallets decreases, and hence there is less pressure upon the fingers 52 of the sprocket wheels. Consequently, as the dispensing action progresses, a point will be reached where the frictional engagement between the numbers 78–82 and 76–80 is too great to allow the sprocket wheels to rotate. At this itme, the operator actuates the handle 108 so as to move the lever 106 from its position where the contacting surfaces 118 and 120 respectively engage the cammed surface portions 126 and 128 of the bar 63 to a position where the surface portions 118 and 120 of the lever 126 engage the bar cammed surface portions 124 and 130. This has the effect of increasing the distance by which the bar 63 is separated from the metal strip 96, and correspondingly decreases the pressure of the brake members 76 and 78 upon their respective discs 80 and 82. The sprocket wheels 44, 46, 48 and 50 are now able to rotate more freely, and the dispensing action of the pallets continues. A still further degree of adjustment is provided when the handle 108 is moved to its last remaining position where the lever surfaces 118 and 120 engage the cammed bar surface 122 and 132 so as to separate the bar 63 an even greater distance from the metal strip 96. Under such conditions, the frictional engagement between the brake members 76 and 78 and their associated disc 80 and 82 is either very slight or completely absent, so that the shafts 26 and 28 are free to rotate.

During the time that the enclosure 10 is being loaded with pallets, it is desirable to maintain the shafts or axles 26 and 28 in a locked condition. This is made possible by the provision of a lock bar of generally rectangular dimensions, such bar being designated in FIG. 2 of the drawings by the reference numeral 134. This bar 134 is made adjustable in a lateral direction by dividing it into two portions, one extremity of each bar portion being receivable in the respective ends of a tube 136 into which bar extremities enter in telescoping fashion. The portions of the bar 134 opposite the tube 136 are hinged to the outer surface of the enclosure 10 as at 138, only one such hinge being illustrated.

As best shown in FIG. 2, each of the shafts 26 and 28 is provided on its outermost end with a handle 140 which possesses a number of radially-projecting arms 142 equal in number to the fingers 52 of the sprocket wheels 44, 46, 48 and 50, and with the arms 142 being aligned with the sprocket sheel fingers. The bar 134, when in raised position, allows the handles 140 to rotate freely. However, during loading of the dispenser, the bar 134 is lowered to the position illustrated so that the sides thereof respectfully engage one of the arms 142 on the handles 140 and prevent the shafts 26, 28 from rotating. The presence of the locking bar 134 is advantageous especially during the time that the dispenser is being set up, since it is necessary that the operation of the two shafts 26 and 28 be synchronized, as otherwise one side of the lowermost pallet will drop onto the conveyor belt 22 before the other side of the pallet is released, and this creates a rocking action which may bring about an irregularity in the position of adjacent pallets as they are conveyed by the belt 22 to a remote location. The tube 136 permits the width of the bar 134 to be adjusted as the distance between the shafts 26 and 28 is varied to accommodate different sizes of pallets within the enclosure 10.

The embodiment of applicant's invention described above in FIGURES 1 through 4 is based upon the principle of releasing successive pallets by a gravity feed in which no external source of energy is required. While such an arrangement possesses many advantages, it may in some circumstances be desirable to allow the operator of the mechanism to manually actuate the releasing unit so that the dispensing action, rather than being restrained by a braking mechanism as in the embodiment described above, is instead developed by a positive effort on the part of the operator.

Figure 5:
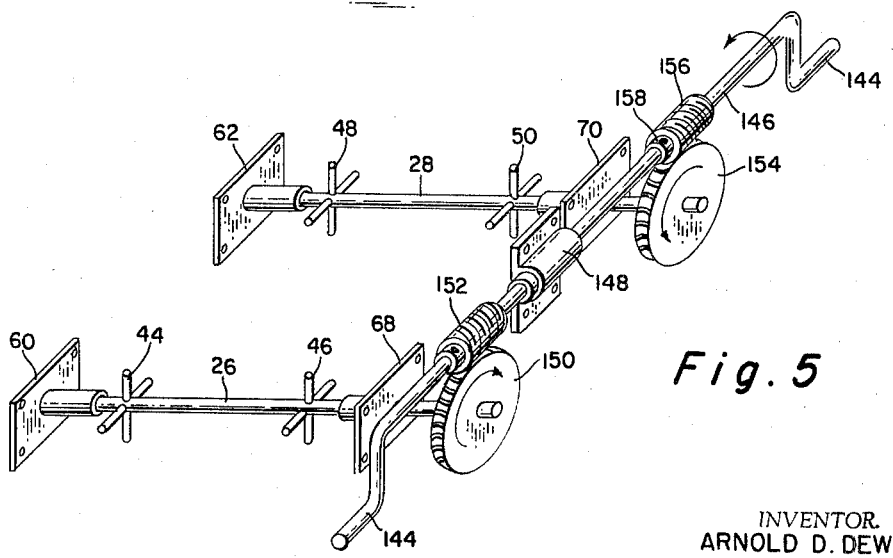
FIG. 5 is an isometric view of a modification of the dispensing mechanism of the device of FIGS. 1 through 4, wherein a gear-controlled assembly is utilized in place of the braking mechanism.

One preferred device by which such a result may be obtained is shown in FIGURE 5 of the drawings. In this embodiment, the shafts 26 and 28 have mounted thereon the sprocket wheels 44, 46, 48 and 50 in a manner identical to that of the embodiment previously described. Also the respective ends of the shaft 26 are carried in flanged bearings 60 and 68, while the respective terminations of shaft 28 are similarly carried in the flanged bearings 62 and 70. However, in the embodiment of FIG. 5 there is no need for either a braking mechanism or a locking bar, and hence all of the components associated with these members can be omitted. In place of the braking mechanism, rotation of the shafts 26 and 28 is brought about by manually-actuatable handles 144 formed on the respective ends of a rotatable shafe 146. This shaft 146 extends transversely to the shafts 26 and 28, and is mounted in a bearing 148 which is secured to the outer surface of the enclosure 10 in a location where the bifurcated bar 63 was disposed in the embodiment of FIGS. 1 through 4. Although only a single bearing is illustrated in the embodiment of FIG. 5, it will be understood that if necessary or desirable (to prevent the shaft 146 from "wobbling") two or more bearings may be employed in spaced-apart relation.

Shaft 26 carries thereon a worm gear 150 which is designed to mesh with a further worm gear 152 carried on the shaft 146. In similar fashion, shaft 28 carried thereon a worm gear 154 designed to mesh with a gear 156 carried on the shaft 146. The threading of the meshing gears 150–152 is different from that of the meshing gears 154–156, so that, upon actuation of a handle 144, the respective gears 150 and 154 will turn in opposite direction, as indicated in the drawing by the arrows. This will produce a movement of the shafts 26–28 similar to that which took place during the dispensing action described in the embodiment of FIGURES 1 through 4.

To allow the device of FIG. 5 to accommodate pallets of different sizes, each of the worm gears 152 and 156 is provided with a collar 158 through which passes a screw 160. When longitudinal adjustment of the worm gears 152–156 is required, they may be repositioned axially on the shaft 146 and then the screws 160 tightened to retain the gears in their new locations.

It should be noted that in the embodiment of FIG. 5 the rotation of the axles 26 and 28 is automatically synchronized, and consequently there is no need for the handles 140 of FIG. 2 or for the locking bar 134 associated therewith. Regardless of the weight of the stack of pallets in the enclosure 10, the basic nature of a worm gear assembly is such that no rotation of the shafts 26 and 28 can occur unless the shaft 146 is turned as a result of manual actuation of one of the handles 144.

It will now be recognized that the pallet-dispensing device herein set forth possesses a number of advantages not found in mechanisms previously employed for similar purposes. Apart from its simplicity and ease of construction, it can be made sufficiently light in weight so as to be readily transported from one location to another without extensive dismantling. It is readily adaptable for use with conveyor belts of varying heights by choosing a correct length for the supporting members 16. The presence of the guide rods 38 renders the dispenser versatile in that it can accept pallets of different widths and at the same time dispense them from the center of the device onto a moving belt or platform. Inasmuch as no outside source of power is required, the number of parts is reduced to a minimum, and maintenance is seldom required.

Obviously many modifications and variations of the present invention are possible in the light of the above teachings. It is therefore to be understood that within the scope of the appended claims the invention may be practiced otherwise than as specifically described.

I claim:

1. A device for sequentially dispensing pallets from a vertical stack thereof onto a moving conveyor belt or platform, said device comprising:

a frame constituting an enclosure designed to receive said stack of pallets, said frame being of substantially rectangular cross-section considered in a horizontal plane, said frame having at least one side which can be selectively opened so that said stack of pallets may be placed therein;

a pair of rotatable shafts lying in a horizontal plane near the lowermost portion of said enclosure, said shafts being disposed in spaced-apart parallel relationship with their axes aligned in the direction of movement of said conveyor belt onto which the pallets stacked in said enclosure are to be sequentially dispensed;

a pair of sprocket wheels carried on each of said shafts, the sprocket wheels on each shaft being spaced apart by a distance less than one dimension of each pallet comprising said stack;

each sprocket wheel including a plurality of radially-projecting fingers, the number of fingers on each sprocket wheel being identical and with corresponding fingers of all four sprocket wheels lying in the horizontal plane of said shafts at a given point in each cycle of shaft rotation, the corresponding fingers of said sprocket wheels when in the said horizontal plane engaging an undersurface of the lowermost pallet in said stack and supporting such pallet thereon;

means for producing a rotation of each of said shafts in opposite directions so as to bring about a disengagement between the said sprocket wheel fingers and the lowermost one of said pallets, whereupon the latter is released to fall upon said moving conveyor belt, said last-mentioned means comprising:

a first pair of worm gears mounted on corresponding ends of each of said shafts, said worm gears being threaded oppositely to one another;

a control shaft rotatably carried by said housing and extending in a direction transverse to the direction of each of said first-mentioned pair of shafts but parallel to the horizontal plane of the latter;

a second pair of worm gears carried by said control shaft and designed to respectively mesh with said first pair of worm gears, said second pair of worm gears also being threaded oppositely to one another;

whereupon manual actuation of said control shaft to produce a limited rotation thereof will act to turn said pair of shafts in opposite directions and thus bring about a disengagement between the fingers of the sprocket wheels mounted thereon and the undersurface of the lowermost pallet in said stack, thereby achieving the dispensing objective of said device.

2. A device for sequentially dispensing pallets from a vertical stack thereof onto a moving conveyor belt or platform, said device comprising:

a frame constituting an enclosure designed to receive said stack of pallets, said frame being of substantially rectangular cross-section considered in a horizontal plane, said frame having at least one side which can be opened so that said stack of pallets may be placed therewithin;

a pair of rotatable shafts lying in a horizontal plane near the lowermost portion of said enclosure, said shafts being disposed in spaced-apart parallel relationship with their axes aligned in the direction of movement of said conveyor belt onto which the pallets stacked in said enclosure are to be sequentially dispensed;

a pair of sprocket wheels carried on each of said shafts, the two sprocket wheels on each shaft being spaced apart by a distance less than one dimension of each pallet comprising said stack;

each sprocket wheel including a plurality of radially-projecting fingers, the number of fingers on each sprocket wheel being identical and with corresponding fingers of all four sprocket wheels lying in the horizontal plane of said shafts at a given point in each cycle of shaft rotation, the corresponding fingers of said sprocket wheels when in the said horizontal plane engaging an undersurface of the lowermost pallet in said stack and supporting such pallet thereon, the weight of the pallets in said stack as applied to said fingers tending to exert a force on said sprocket wheels which would normally cause rotation of said shafts, such shaft rotation resulting in a disengagement between said lowermost pallet and the fingers of said sprocket wheels upon which such lowermost pallet was supported, thereby releasing such pallet onto said conveyor belt; and manually controllable means for concurrently precluding rotation of both of said shafts to thereby prevent the release of said pallets from said stack, said manually-controllable means including a pair of annular braking members respectively carried by said pair of shafts on corresponding ends thereof, each of said annular members being composed of material having a relatively high coefficient of friction;

a pair of non-rotatable discs positioned for respective compressional engagement with said pair of annular braking members; and means for creating different degrees of compressional engagement between each disc and the annular braking member associated therewith so as to produce a corresponding difference in the frictional contact therebetween, as a result of which variations are produced in the amount of force required on the fingers of said sprocket wheels to produce a rotation of said shafts and a consequent dispensing of said pallets.

3. The combination of claim 2, in which the means for creating different degrees of compressional engagement between each of said discs and the particular annular braking member associated therewith comprises:

an elongated bar having a pair of bifurcated ends through which bifurcations the said pair of shafts respectively pass, said bar being located exteriorly of said enclosure and disposed between one outer surface thereof and the respective extremities of said shafts on which the said annular braking members are carried, said pair of non-rotatable discs being respectively secured to the bifurcated portions of said bar in such fashion that said shafts respectively pass axially therethrough;

said bifurcated bar possessing a plurality of cammed surfaces facing outwardly of said enclosure; and a lever designed for manual actuation, said lever being rotatable so as to bring different portions thereof into engagement with selected ones of said plurality of cammed bar surfaces to thereby change the position of the latter with respect to said enclosure and accordingly change the frictional relationship between the discs carried by said bar and the respective annular braking members carried by said shafts.

4. The combination of claim 3, further comprising:

a second pair of sprocket wheels respectively carried by said pair of shafts on corresponding ends thereof opposite to those on which said pair of annular braking members is carried, said second pair of sprocket wheels each having a plurality of radially-projecting fingers equal in number to the fingers of that one of said first pair of sprocket wheels carried on the same shaft;

a locking bar of generally rectangular outline secured to the outer surface of said enclosure;

means for pivotally supporting said locking bar so that the latter is capable of limited movement to a position where it engages one finger of each of said second pair of sprocket wheels and thereby precludes rotation of each of said pair of shafts during the time period when such engagement is in effect, subsequent movement of said locking bar out of engagement with the said fingers of said second pair of sprocket wheels permitting rotation of said shafts to again take place.

References Cited by the Examiner

UNITED STATES PATENTS

| | | | |
|---|---|---|---|
| 1,974,277 | 9/1934 | Johnson | 221—295 |
| 2,661,991 | 12/1953 | Petrecca | 221—248 |
| 2,693,898 | 11/1954 | Epperson | 221—295 |
| 2,858,043 | 10/1958 | Fenton | 221—9 |
| 2,875,907 | 3/1959 | Locke | 214—6 |
| 3,143,222 | 8/1964 | Caskie | 214—6 |

FOREIGN PATENTS

| | | |
|---|---|---|
| 207,375 | 2/1957 | Australia. |

MARVIN A. CHAMPION, *Primary Examiner.*